United States Patent [19]

Oestreich et al.

[11] Patent Number: 5,210,813
[45] Date of Patent: May 11, 1993

[54] OPTICAL CABLE AND METHOD FOR MANUFACTURING THE OPTICAL CABLE

[75] Inventors: Ulrich Oestreich, Munich; Reiner Schneider, Ebersdorf, both of Fed. Rep. of Germany

[73] Assignee: Siemens Aktiengesellschaft, Munich, Fed. Rep. of Germany

[21] Appl. No.: 803,617

[22] Filed: Dec. 9, 1991

[30] Foreign Application Priority Data

Jan. 17, 1991 [DE] Fed. Rep. of Germany ....... 4101271

[51] Int. Cl.$^5$ .................................. G02B 6/44
[52] U.S. Cl. ...................................... 385/105
[58] Field of Search ................... 385/103–106

[56] References Cited

U.S. PATENT DOCUMENTS 4,199,224 4/1980 Oestreich ..................... 385/103 X
4,820,014 4/1989 Nishimura et al. .................. 385/105

FOREIGN PATENT DOCUMENTS 2928678 1/1981 Fed. Rep. of Germany .
3839109 5/1990 Fed. Rep. of Germany .
2184563 6/1987 United Kingdom .
2230355 10/1990 United Kingdom .

Primary Examiner—Akm E. Ullah
Attorney, Agent, or Firm—Hill, Steadman & Simpson

[57] ABSTRACT

An optical cable comprising a central element surrounded by a layer containing a plurality of inwardly opening chambers, with each chamber receiving a stack of bands, which bands contain a plurality of waveguides. Preferably, each of the chambers is formed by a sub-element which has a U-shape in cross section and the sub-elements are formed on the cable core in a stranded manner, either by being stranded individually thereon or by being extruded individually thereon.

17 Claims, 3 Drawing Sheets

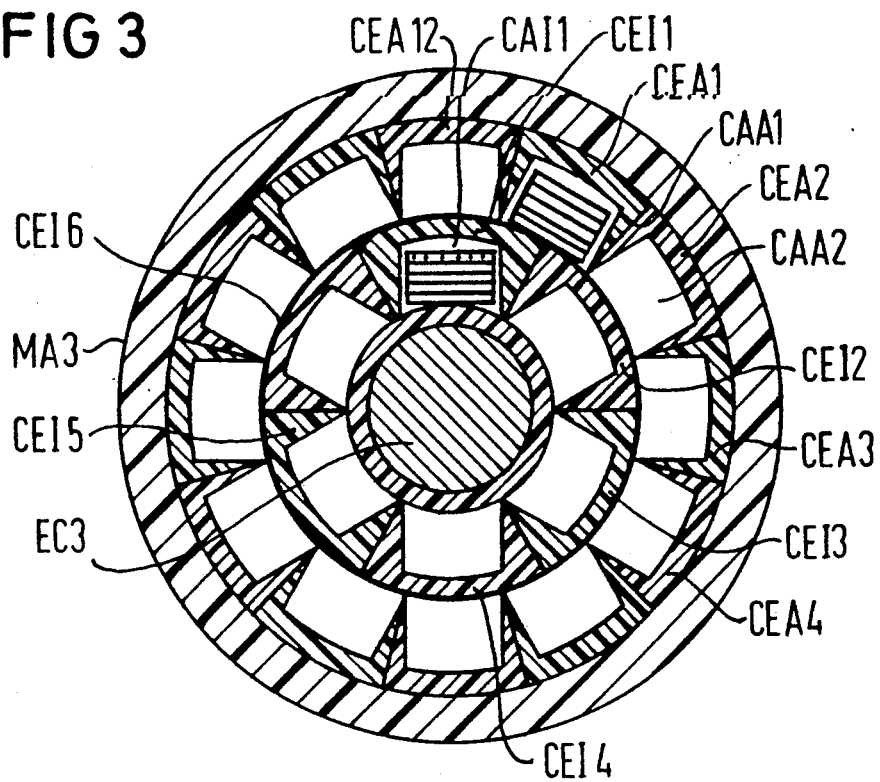
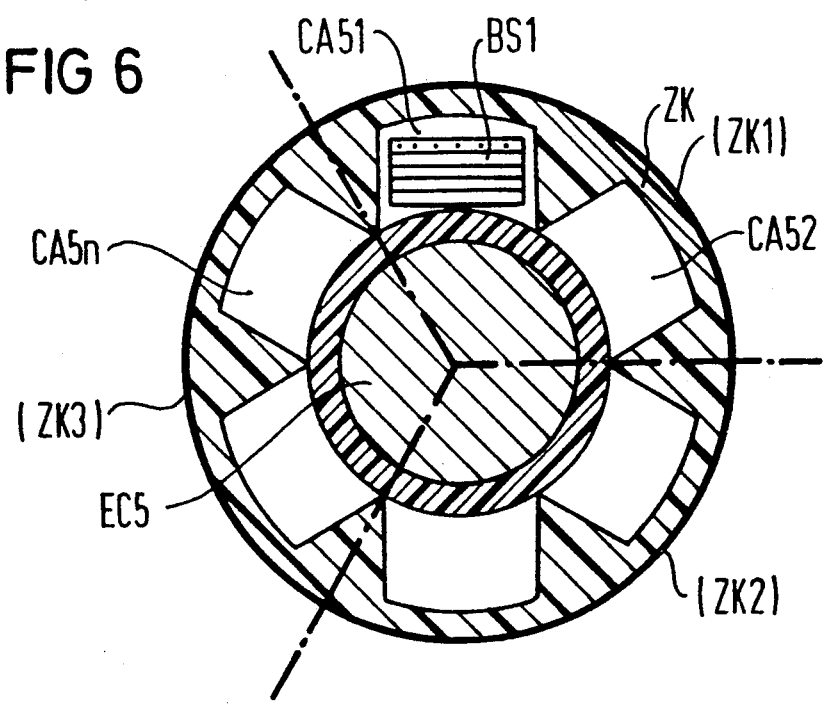

OPTICAL CABLE AND METHOD FOR MANUFACTURING THE OPTICAL CABLE

BACKGROUND OF THE INVENTION

The present invention is directed to an optical cable having chambers distributed over the cable circumference, with each of the chambers serving for the acceptance of a stack of a plurality of bands or ribbons, with each of the bands or ribbons containing a plurality of light waveguides, with the stacks in one chamber being separated from the stack in the adjacent chamber by chamber walls forming partitions.

German OS 29 28 678 discloses an optical cable which is provided with chambers that open on one side, wherein the cable core, itself, is composed of a plurality of sub-elements. Parting seams that proceed approximately radially are provided for this purpose. According to the specific embodiment, the design of the cable core can also be undertaken so that the chambers open in an inward direction, namely in the direction toward an open, central space that is present in the region of the cable core as a through opening. In the known cable, the light waveguides themselves are arranged as discrete light waveguides.

German OS 38 39 109 discloses a stack of a plurality of bands being arranged in a chamber in what is referred to as a "chambered cable". Each of the bands of the stack contains a plurality of light waveguides and the chamber itself is designed with an approximately rectangular cross section and opens outward. Each of the chambers is illustrated as being formed by a segment that coacts with other segments to form a plurality of chambers opening outward around the reinforcing central core.

SUMMARY OF THE INVENTION

The object of the present invention is to create an optical cable that can be manufactured in a simple way and that can accommodate a great number of light waveguides in the region of the cable core.

In order to accomplish this, the invention is directed to an improvement in an optical cable which comprises a core element with a surrounding layer containing chambers distributed over the circumference of the layer to serve the purpose of accepting stacks of a plurality of bands, with each band containing a plurality of light waveguides, wherein the chambers are separated from each other by a partition or chamber wall. The improvements are that the chambers open radially inward and the partitions or walls between the chambers have the narrowest thickness in the radial, innermost position. While the entire plurality of chambers can be a single element, preferably, the chambers are in a sub-element, which may have one or more chambers, and a plurality of the sub-elements are arranged around the core element.

In the invention, the inwardly opened chambers are seated on the core element so that a stable, high bearing structure occurs. It is also guaranteed that the wall between the individual sub-elements abutting one another can be designed so that the optimum space-saving structure is achieved. By contrast to a chamber system that opens radially outward, the invention requires no minimum wall thickness in the region of the base of each of the chambers, i.e., where the chamber wall strikes the core element. When, by contrast, the outwardly opened chambers are produced by extrusion of a chamber element shaped approximately like a spoked wheel onto a tensile core, then a minimum thickness is also necessary in the region of the base of each of the chambers, and this dare not be downwardly exceeded for stability and manufacturing reasons.

The invention is also directed to a method of manufacturing an optical cable which is characterized in that the sub-elements that contain the chambers or, respectively, the central element or the core element, are provided with the stack of bands and that the sub-element, together with the stack of bands contained therein, are applied on the core element in one-layer or multi-layer fashion and in that at least one of the outside claddings is subsequently applied.

Other advantages and features of the invention will be readily apparent from the following description of the preferred embodiments, the drawings and claims.

BRIEF DESCRIPTION OF THE DRAWINGS

FIG. 3 is a cross sectional view of an optical cable of the present invention having a multi-layer cable core;

FIG. 6 is a cross sectional view of a one-piece element or layer with the chambers in accordance with the present invention.

DESCRIPTION OF THE PREFERRED EMBODIMENTS

Figure 1:
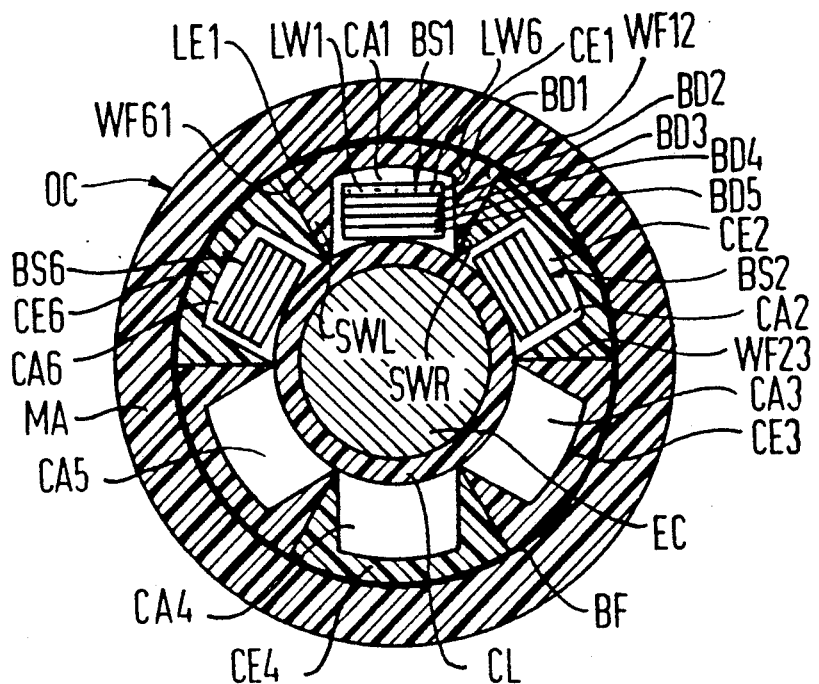
FIG. 1 is a cross sectional view of a first embodiment of an optical cable in accordance with the present invention.

The principles of the present invention are particularly useful when incorporated in an optical cable, generally indicated at OC in FIG. 1.

To form the optical cable OC of FIG. 1, a core element EC can be expediently composed of a tensile material, for example steel-reinforced plastic or, for example, a fiberglass-reinforced plastic. A plastic coating CL can be provided on the core element EC. A total of six chambered elements or sub-elements CE1-CE6 are arranged on this core element EC in a segment-shaped arrangement so that their respective chambers CA1-CA6 have their openings directed radially inward toward the inside, or pointed in the direction toward the core element EC. The chambers CA1-CA6 have an approximately rectangular cross section and contain a respective band stack BS1-BS6 which is composed of a plurality of small bands or ribbons, which are accommodated in each of the chambers. As indicated in greater detail in the chamber CA1, five such bands BD1-BD5 are present to form the band stack BS1. These bands are essentially in a tangential arrangement, for example the stack occurring in a radial direction. Each of these bands BD1-BD5 contain a plurality of light waveguides, for example six light waveguides LW1-LW6, as shown in the band BD1. Each of these waveguides is introduced into a common envelope that forms the band. The introduction of the band stacks BS1-BS6 into the chambers CA1-CA5 expediently occurs so that these continue to retain a certain mobility, but a change in position, for example folding over or tilting over, is avoided. It is adequate when a narrow gap is provided all around the band stack insofar as possible. This can be potentially closed with a soft filling compound that can, likewise, contribute to establishing the position. However, it is also possible to provide a turnability or rotatability for the bands BD1-BD5 inside the chamber CA1, wherein a twisting having alternate directions in the fashion of an SZ-stranding of the bands can also be advantageous.

The sub-elements CE1-CE6 each, respectively, comprise a U-shaped cross section having their lateral legs, such as SWL and SWR for the element CE1, fashioned so that these taper in a radially inward direction. The wall thickness is reduced to a value between 0 mm, fashioning such as a point or line contact, and 0.1 mm in the region of the seating area on the core elements EC. These values are significantly lower than, for example, in an arrangement wherein the radially outward opening chambers are provided, because the cross sectional transition need not be taken into consideration. For reasons of fabrication and strength, a reduction of the wall thickness in the region of the core element to such a low value is not possible in the prior-type arrangements.

The cohesion of the sub-elements CE1-CE6 stranded onto the core element EC can be assured, for example, by providing a winding or covering BF. Subsequently, an outside cladding MA, which may be a multi-layer cladding, is applied further toward the outside, for example by extruding. The optical cable OC obtained in this way is distinguished by a compact structure and offers the possibility of accommodating a great number of light waveguides for an established cross section and also enables a simple and rational manufacture.

Figure 2:
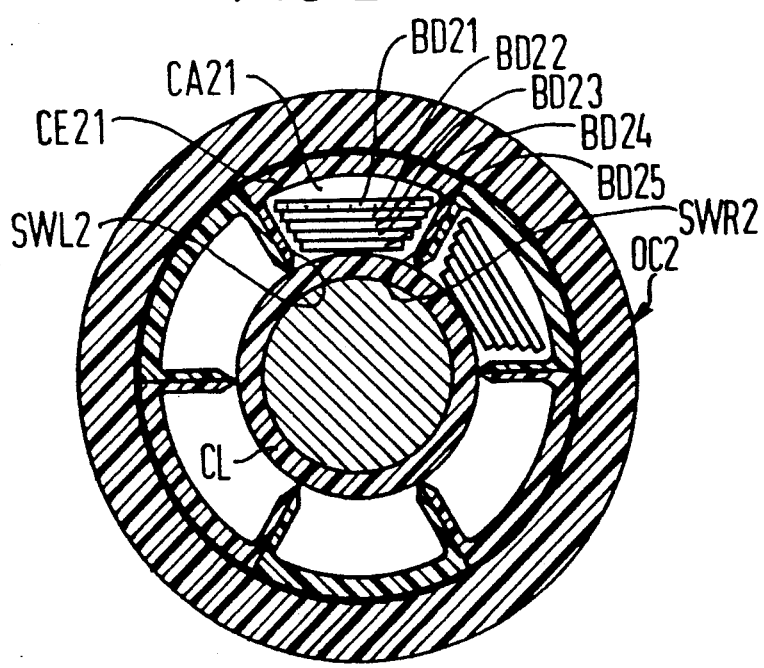
FIG. 2 is a cross sectional view of another embodiment of the optical cable in accordance with the present invention.

When the number of light waveguides is to be further increased, an arrangement conforming to FIG. 2 can be advantageously employed. The chambers, for example, of the sub-element CE21 (FIG. 2) are no longer fashioned with an approximately rectangular cross section, but are, likewise, segment-like. The chamber that broadens toward the outside arises in this way and there is the possibility of providing band stacks BD21-BD25 that approximately fully fill up the space of the chamber, such as CA21, that broadens toward the outside. This means that the bands become wider or broader from the inside toward the outside and can, thus, respectively, contain a greater plurality of light waveguides. The packing density of the light waveguides can, thus be considerably increased with a given cross section or, respectively, a cross section of the cable core. The wall thickness of the side walls, such as SWL2 and SWR2 of the sub-element CE21 is expediently selected so that it remains the same from the inside toward the outside. The wall thickness in the range of between 0.5 mm and 1 mm is adequate for the side walls SWL2 and SWR2. It is thereby assumed that the entire sub-element CE21 is manufactured by an extrusion of, for example, a polyethylene.

Since all the sub-elements have the same cross section in comparison to one another, it is adequate to provide a corresponding extruder head that continuously manufactures such a sub-element as a basic building block in larger-scale solutions. The structure of the cable core can then also be governed by combining an adequate number of such sub-elements, for example six sub-elements.

Since the radial expansion of the chamber elements, for example CE1-CE6 in FIG. 1, cannot be made arbitrarily great for stability or strength reasons, such as the sub-elements should expediently have an inner radial expanse of approximately 2.5 mm through 4 mm, a multi-layer design can be expedient, given a greater number of optical fibers, as shown in the embodiment of FIG. 3. In the cables shown therein, the inner layer similar to the layer of FIG. 1 of six segment-shaped sub-elements CE11-CE16 is provided, first on the core element CE3, and the outside structure of these sub-elements corresponds to the arrangement of FIG. 1. It can be expedient to provide a winding or covering here, for example before the next layer of segment-shaped sub-elements is applied, in order to secure the position of the inner layers CE11-CE16.

A second layer of segment-shaped sub-elements CEA1-CEA12 is then provided further toward the outside, whereby the arrangement expediently occurs so that the respective webs or respective partitions of the inner sub-elements CE11-CE16 and of the outside elements CEA1-CEA12 are not arranged in alignment with one another as viewed in a radial direction. It is assumed in the present example that the second layer of sub-elements CEA1-CEA12 have approximately the same radial expanse as the inner layer and the expanse of the sub-elements CEA1-CEA12 is, for instance, in the circumferential direction and is also similar to that of the inner layer, although it is slightly smaller. When the inner layers Cl1-Cl6 and the outer layers CA1-CA12 are applied in opposite directions, i.e., in reversed-lay, then the radial webs of the two layers cross continuously in a stable overall structure having high flexibility will occur. The cabling of one or both layers can also occur with an SZ-like stranding.

Figure 4:
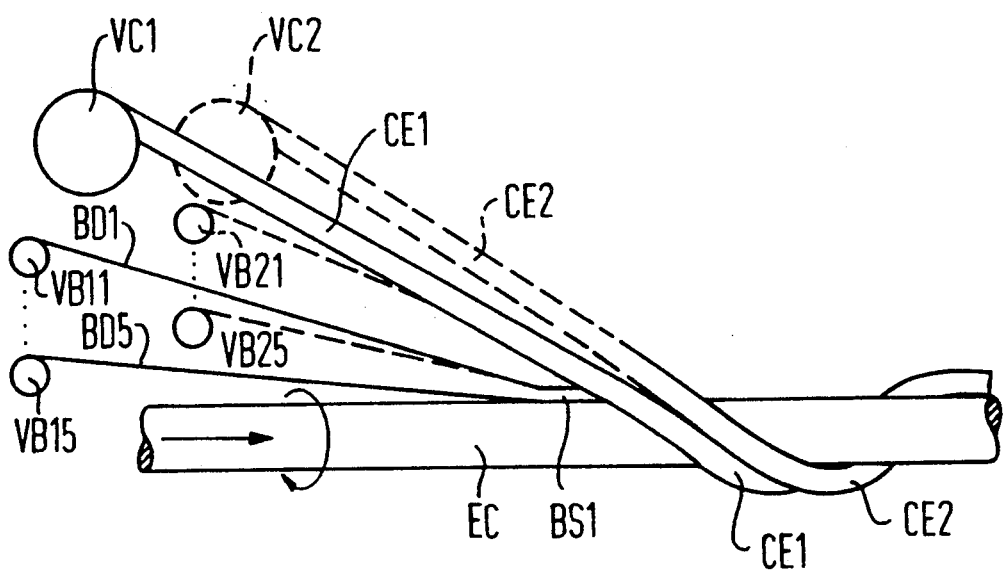
FIG. 4 is a schematic illustration of a first exemplary embodiment of a method for manufacturing the optical cable of the present invention.

FIG. 4 shows the procedural sequence for the manufacture of an optical cable corresponding to the cable of FIG. 1. It is thereby assumed that the sub-elements, such as CE1 and CE2, have been pre-fabricated and are presently wound on supply reels, such as VC1 and VC2, respectively. Only the two sub-elements CE1 and CE2 have been shown in the present example in order to simplify the Figure. The bands BD1-BD5 are taken from supply reels VB11-VB15, whereas the supply reels VB21-VB25 are provided for the bands of the stack BS2 of the sub-element CE2. All illustrated supply reels are stationarily arranged, and it is assumed that the tensile central element EC will rotate around its longitudinal axis and is simultaneously drawn from the left toward the right. However, it is also possible to stationarily fashion the core element EC and to, instead, accommodate the supply reels in a rotating cage.

The individual supply reels VB11-VB15 for the bands BD1-BD5 are arranged so that the bands BD1-BD5, when hauled off under a slight tension, are already combined to form a stack BS1 and potentially come into contact with the core element EC before contacting the sub-element CE1. However, it is also possible, for example on the basis of appropriate guide tubes and/or baffle devices, to see to it that the band stack BS1 is first introduced into the inside of the chamber CA1 of the sub-element CE1 and then stranded onto the core element EC together with the sub-element. One proceeds in the same way with the other sub-elements so that all sub-elements that form a closed, circular ring figure are applied onto the core element EC at the end of the cabling process in one working cycle, which, in the present example, only two sub-elements, namely CE1 and CE2, are shown in order to keep the Figure simple. Subsequent to stranding the sub-elements CE1–CE6 on the core element EC, a cladding can be applied to obtain the cable OC of FIG. 1.

The application of the sub-elements CE1–CE6 can occur in a long lay process, however, it is also possible to work with alternating directions of stranding, i.e. SZ-stranding, to subject the core element EC to a reverse rotation in respectively defined, successive time intervals.

Figure 5:
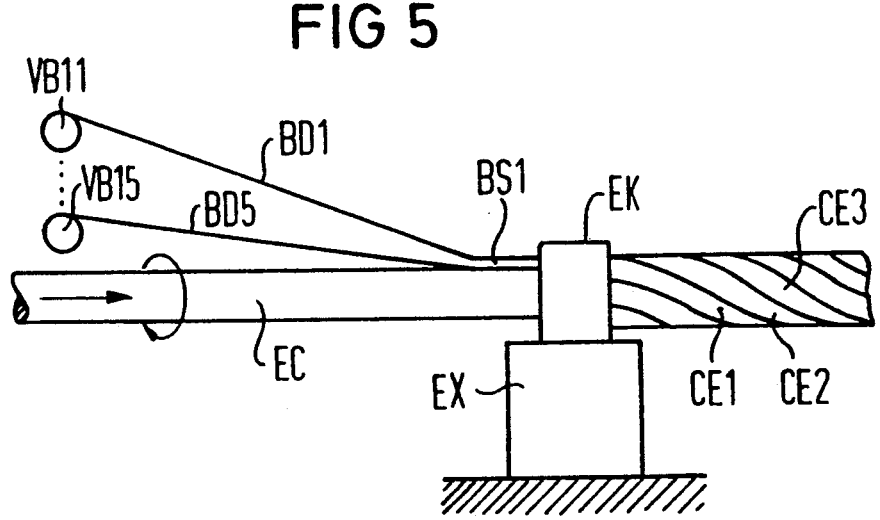
FIG. 5 is a schematic illustration of another embodiment of a method for manufacturing the optical cable of the present invention.

It has likewise been assumed in the illustration of FIG. 5 that the core element EC rotates, wherein the sub-elements CE1–CE6, by contrast to the arrangement of FIG. 4, are not pre-fabricated, but are likewise co-manufactured within the framework of applying the band stacks. The bands BD1–BD5 that form the stack BS1 are likewise arranged on supply reels VB11–VB15 and are hauled off therefrom. The band stack BS1 is formed immediately before entry into a head EK of an extruder EX. The discharges of the extruder head EK are designed so that, conforming to the example of FIG. 1, six sub-elements CE1–CE6, which are independent of one another, are formed and these are respectively extruded practically bridge-like over the appertaining band stacks BS1–BS6, according to FIG. 1, wherein a connection to the core element EC is not required. As mentioned in the case of FIG. 4, alternating cabling directions can also be employed here. For example, the rotational sense of the core element EC can periodically be changed.

A particular advantage of the cable structure of the invention may also be seen wherein the sub-elements, for example CE1–CE5 of FIG. 1, are joined in an outward direction to form a closed, ring-shaped structure which, in view of the supporting function, is to be evaluated overall as being similar to a continuous pipe. The individual sub-elements thus form quasi-supporting arches and thereby yield a stable overall structure, due to the mutual lateral support, even given extremely low wall thickness of the partitions.

An excess length of the ribbon stacks BS1–BS6 of FIG. 1 that may be potentially necessary can be achieved in that these are introduced in thrusting fashion when being applied onto the core element EC. However, it is also possible to keep the core element EC under an axial pre-dilatation in the region of the insertion point of FIGS. 4 or 5, wherein the ribbon stacks are supplied to the core element EC and to, in turn, remove this axial pre-dilatation after the end of the application process for the ribbon stacks and for the sub-elements. The shrinkage of the center element EC involved therewith effects the relative excess length of the ribbon stacks.

It is also possible to extrude a closed layer element ZK of FIG. 6 with the apparatus of FIG. 5. The shape of this closed layer or member ZK corresponds approximately to that of the inside toothing with chambers, such as CA51–CA5n, being radially inwardly opening toward the central element EC5. The one-piece layer or member ZK has, thus, replaced individual sub-elements. It is also possible to compose the layer member ZK of a plurality of sub-members, each of which comprises a plurality of chambers. This is indicated in FIG. 6 by dot-dash, radial parting lines that form the central sub-elements ZK1, ZK2 and ZK3.

Although various minor modifications may be suggested by those versed in the art, it should be understood that we wish to embody within the scope of the patent granted hereon all such modifications as reasonably and properly come within the scope of our contribution to the art.

We claim:

1. In an optical cable comprising a core element with a layer surrounding the core element, said layer having sub-elements with at least one chamber and said sub-element being distributed over the circumference, each of said chambers accepting a band stack, each band stack being composed of a plurality of bands with each band comprising a plurality of light waveguides, said chambers being separated by walls, the improvement comprising the chambers being opened radially inward and the walls of the chambers having their smallest thickness adjacent the core element, said sub-element being arranged segment-shaped around the core element and said sub-elements forming a closed, ring-shaped structure in an outward direction.

2. In an optical cable according to claim 1, wherein each of the sub-elements has a single chamber, each sub-element expands toward the radial outside and is fashioned approximately U-shaped in cross section.

3. In an optical cable according to claim 2, wherein each of the chambers broadens as the radial distance from the core element increases.

4. In an optical cable according to claim 3, wherein the light waveguide bands in each of the stacks increases in width as the radial distance of the band from the core element increases so that the number of light waveguides contained in the band increases as the distance of the band from the core element increases.

5. In an optical cable according to claim 3, wherein the wall thickness of the chamber remains approximately the same from the inside toward the outside in the regions in which the walls engage adjacent elements.

6. In an optical cable according to claim 2, wherein the wall thickness of each of the sub-elements tapers when taken in the direction radially inward.

7. In an optical cable according to claim 2, which includes at least one additional layer disposed outward of the first-mentioned layer, said additional layer including a plurality of radially inwardly opening sub-elements stranded on the closed, ring-shaped structure formed by the first-mentioned layer.

8. In an optical cable according to claim 1, wherein each of the sub-elements has a plurality of chambers and is extruded on the core element.

9. In an optical cable according to claim 1, wherein each sub-element contains more than one chamber.

10. A method of manufacturing an optical cable having a core element surrounded by a layer of a plurality of sub-elements arranged segment-shaped around the core element and forming a closed, ring-shaped structure, each sub-element having at least one chamber which opens radially inward toward the core element, each of said chambers receiving a stack of a plurality of bands with each band containing a plurality of waveguides, said method comprising the steps of providing a central core element, forming the layer of the sub-elements on the core element with the sub-elements arranged with the chambers opening radially inwardly toward the core element, assembling a band stack in each of said chambers, and applying an outer cladding on the layer.

11. A method according to claim 10, wherein the step of assembling each of the band stacks in the chambers includes holding the stack positionally secured in each of said chambers.

12. A method according to claim 11, wherein the step of holding each of the band stacks positionally secure in the respective chamber includes adding a filling compound.

13. A method according to claim 10, wherein the step of forming the layer having a plurality of sub-elements comprises extruding the layer on the core element as a plurality of sub-elements each having a plurality of inwardly opening chambers as the core element is being pulled through an extruder head.

14. A method according to claim 10, wherein the steps of forming the layer and assembling the stacks are accomplished by stranding the sub-elements with their respective stacks of bands on said core element.

15. A method according to claim 14, wherein the step of stranding includes changing the direction of the lay.

16. A method according to claim 14, wherein each of the sub-elements is pre-fabricated and is taken from a supply reel and the elements are cabled onto the core element together with the band stacks.

17. A method according to claim 14, wherein the forming of each of the sub-elements is by an extrusion and includes supplying each of the bands to an extruder head so that the band stacks are assembled on the core element as the sub-element is extruded thereon.

* * * * *